United States Patent
Wallis

Patent Number: 5,740,371
Date of Patent: Apr. 14, 1998

[54] LOAD BALANCING OF CONNECTIONS TO PARALLEL SERVERS

[75] Inventor: Graham Derek Wallis, Locks Heath, United Kingdom

[73] Assignee: International Business Machines Corporation, Armonk, N.Y.

[21] Appl. No.: 617,461

[22] Filed: Mar. 18, 1996

[30] Foreign Application Priority Data

Sep. 30, 1995 [GB] United Kingdom ............... 9520035

[51] Int. Cl.$^6$ .................. G06F 15/16; H04L 12/26
[52] U.S. Cl. ................ 395/200.59; 395/200.56; 395/412; 395/200.65
[58] Field of Search ............ 395/200.57, 200.58, 395/200.59, 200.68, 200.69, 200.71, 200.75, 412, 413, 674, 675

[56] References Cited

FOREIGN PATENT DOCUMENTS

| 0648038 | 4/1995 | European Pat. Off. | ........ H04L 29/06 |
|---|---|---|---|
| 2281793 | 3/1995 | United Kingdom | ............ G06F 15/16 |

Primary Examiner—Alyssa H. Bowler
Assistant Examiner—Scott Juneau
Attorney, Agent, or Firm—W. A. Kinnaman, Jr.

[57] ABSTRACT

A system and method for facilitating compatibility with a prior process used for connecting a user terminal to a selected server in a system having a plurality of servers. The prior process has the server perform a task on behalf of the terminal. The system includes a server determination process for retrieving from storage a table of data identifying the servers, and for determining an address currently associated with each server. Then, a chooser process enables the user to select from the table, one of said servers for connection to the terminal with a connection process, responsive to a signal from the terminal, that initiates a connection of the terminal to the selected server. The plurality of servers in the system includes at least one parallel server comprised of multiple processors. The data in the table identifying the parallel server is a generic identifier, and a process is employed, which preferably uses predetermined dynamic criteria, to periodically associate a specific processor of the parallel server with that generic name. To enable the load to be balanced across the plural processors of the parallel server, the server determination process is adapted to recognize any generic identifier in the table, and to determine the address associated with that generic identifier after a user selection of the parallel server corresponding to that generic identifier has been made.

10 Claims, 3 Drawing Sheets

LOAD BALANCING OF CONNECTIONS TO PARALLEL SERVERS

FIELD OF THE INVENTION

The present invention relates to the connection of computer terminals to server computers so as to enable the server computers to perform tasks on behalf of the terminals. In particular, the present invention provides a technique for enabling connections to be made between terminals and a server having a plurality of parallel processors so as to balance the load across those parallel processors. Such a server will be referred to hereafter as a parallel server.

BACKGROUND ART

The present invention applies to a type of terminal which shall be referred to hereafter as a 'dumb' terminal. Typically a dumb terminal, when in use, will have software installed on it to provide presentation logic to manage interaction between the terminal and its user. As will be appreciated by those skilled in the art, this would typically take the form of a graphical user interface (GUI). However, the dumb terminal may not have all the functionality it requires installed thereon, and must therefore call upon the services of other machines to perform additional processing. For this purpose, the terminals will be connectable via a network, such as a LAN running Ethernet, to other computer systems which can act as servers for these terminals.

In some circumstances a dumb terminal may be configured to always connect to a particular server, or in other cases the dumb terminal may be connected to one of a plurality of different servers. In the latter case the choice of server may be made when the dumb terminal is switched on or reset. The process of choosing a server may optionally involve the use of an intermediate entity on the network to manage the connection of the terminal to a suitable server. This intermediate entity may be a separate server or may be one of the servers to which the dumb terminal may connect.

One example of a dumb terminal is an X terminal, this being a graphical display terminal which runs the presentation logic for the X Window System (a trademark of Massachusetts Institute of Technology). An X terminal must be connected to a server which has the X Window system installed to enable the server to run X Window programs which provide the processing support required by the X terminal.

There are three distinct methods of establishing a connection between an X terminal and a server, these being called 'direct', 'indirect' and 'broadcast'. A 'direct' connection indicates that the X terminal has been configured to always connect to the same server, in which case there is no need for an intermediate entity to assist in selection of a server. A 'broadcast' connection indicates that the X terminal may connect to any available server on the network, and once again there is no need for an intermediate entity to assist in selection of a server. An 'indirect' connection indicates that the X terminal will initially contact an intermediate entity, hereafter called the XDMCP host, which runs a program called XDM which will assist the X terminal in the selection of a server. The role of XDMCP host may be performed by any of the servers to which the X terminal may ultimately connect, or it may be performed by a machine which is not within that set of servers.

Where an indirect connection is used, the XDMCP host contains a list of possible servers in its configuration files. When the XDM program is started on the XDMCP host, the names of any servers in the list are read, and their network addresses are determined by referring to name server facilities available over the network. Subsequently, when a particular server from the list is selected, the address information can be retrieved and the connection made. The time at which the resolution of names to addresses occurs is important, as will become apparent from the following discussion.

If one or more of the servers is a parallel server, then a specific processor within the server has to be selected to handle the processing required by the terminal. In order to maximise the efficiency of use of a parallel server it is desirable to balance the load across the processors as evenly as possible. Part of this load will be attributable to tasks performed to support terminals connected to the parallel server. It is desirable to balance this particular type of load by automatically connecting a terminal to the least heavily loaded processor of the parallel server.

There are several approaches that have been developed which attempt to balance the load on processors of a parallel server. A brief taxonomy of these includes:

a) Static balancing b) Dynamic balancing i) per-session (session granularity)

ii) migratable (sub-session granularity)

Static balancing requires the administrator of the server to estimate the distribution of loads across the parallel server, and attempt to even out the load via permanent associations between clients (such as terminals) and the processors of the parallel server. This is appropriate in some circumstances, but has obvious disadvantages when compared to dynamic systems which will adapt to the changing loads on the server processors.

Dynamic load balancing can be achieved by using a 'per-session' load balancing technique. This type of dynamic load balancing is performed at creation of a session or submission of a job, and the affiliation between the client machine and the server lasts for the duration of the session or job. Currently research is being carried out into 'migratable' dynamic load balancing techniques, where jobs can be migrated from one server processor to another at any stage during their processing, in response to a change in load across the processors of the server.

Published European Patent application EP0,648,038 describes a 'per-session' dynamic load balancing technique to enable the load on a parallel server to be balanced across the various processors (or computers) forming the server. When a program on a client computer wishes to connect to a processor of the parallel server, it communicates with a data processing system, often called a name server, to obtain the network address (such as the IP address if using TCP) for the desired server. According to the technique described in EP0,648,038, decision logic is provided to periodically study the processors or computers in the parallel server and, based on some configurable criteria, to select one of those processors. The configurable criteria can be chosen such that the least heavily loaded processor at the time the criteria are applied will be selected by the decision logic. The address for this processor is then associated with a generic server name in storage available to the name server, so that each time a client program requests a machine address using the generic server name, it is given the address of the processor in the parallel server that was most recently chosen by the decision logic. For more details of this technique, reference should be made to EP0,648,038.

This arrangement works satisfactorily if the determination of the address from the generic server name occurs at the time that the client program wishes to access the parallel server. However, with the dumb terminals described above, this is not generally the case since the addresses of the various servers available to the terminals are usually determined at some earlier point in time, for example during initialisation of the intermediate entity (eg the XDM program on the XDMCP host in the X terminal example given earlier). In certain connection modes, these addresses are then used by the intermediate entity to contact each server to establish its state of readiness, prior to presentation of a list of available servers to the user of the dumb terminal.

When one or more of the available servers is a parallel server, the above approach means that the user is only given the option of connecting to some earlier-determined processor of the parallel server, this not necessarily being the least heavily loaded at the time the user wishes to connect the X terminal to that server.

Since the software used to manage the connection of the terminal to a suitable server is typically large and complex, it is not generally practical for the users of such software to make any direct alterations to the software. Considering the X terminal example, in which the design of the XDM program is based almost entirely on network addresses rather than domain names, it is not desirable to alter the XDM code to defer resolution of the network addresses of the servers until the time that an X terminal wishes to connect to a server. Such alterations to the XDM code could cause complications for other processes performed by the XDM program, for example affecting XDM's ability to support other existing connection strategies.

Hence, it is an object of the present invention to alleviate the above described problems, so as to enable connections to be made between a dumb terminal and a parallel server in a manner which balances the load across the processors of the parallel server. Furthermore, in preferred embodiments, this should be achieved without requiring modification of the main program used by the intermediate entity to assist in selection of a server (eg the XDM program in the X terminal example).

DISCLOSURE OF THE INVENTION

Viewed from a first aspect, the present invention provides a system for facilitating connection of a terminal to a server to enable the server to perform a task on behalf of the terminal, there being a plurality of servers which the terminal may connect to, and the system comprising: server determination means for retrieving from a storage means data identifying the plurality of servers, and for referencing an address conversion means to determine an address currently associated with each server; chooser means for providing information about the plurality of servers to the terminal, the terminal being arranged to display this information so as to enable the user to select one of said servers for connection to the terminal; and connection means, responsive to a signal from the terminal indicating a user selection of one of said servers, to initiate connection of the terminal to the selected server; the system being characterised by: at least one of the plurality of servers having multiple processors, the data in the storage means identifying that server being a generic identifier for the processors within that server; the address conversion means having means for periodically identifying one of the processors of that server based on predetermined criteria, and for updating the information in the address conversion means such that at any instant in time, the address associated with the generic identifier is the address of the identified processor; the server determination means being adapted to recognise any generic identifier, and to reference the address conversion means to determine the address associated with that generic identifier after a user selection of the server corresponding to that generic identifier has been made.

Preferably, the chooser means is adapted to identify a user selection of a server represented by a generic identifier, and to respond to such a user selection by instructing the server determination means to reference the address conversion means to determine the address associated with that generic identifier. In preferred embodiments, the server determination means is incorporated within the chooser means.

The information displayed to the user of the X terminal about the plurality of servers can take various forms. However, in preferred embodiments, the chooser means is arranged such that, upon retrieval by the server determination means of data identifying the plurality of servers, the chooser means contacts any of said servers which are not identified by a generic identifier to determine whether they are able to manage a connection with the terminal, but does not contact prior to user selection any server identified by a generic identifier, the information thus displayed on the terminal identifying any servers with generic identifiers, in addition to any other servers which the chooser means has determined are able to manage the connection with the terminal.

It will be apparent that the generic identifier identifying a server having multiple processors can take any suitable form. For instance, to enable such generic identifiers to be recognised by the server determination means, a prefix can be included in the generic identifier, or alternatively the data in the storage means can be arranged such that all servers having multiple processors are contained in a sub-list identified by some predetermined identifier. In preferred embodiments, the generic identifier has a keyword associated with it.

The present invention is generally applicable to the balancing of dumb terminal connections to parallel servers. However, in preferred embodiments, the terminal is an X terminal arranged to run the presentation logic for the X Window system, and the server determination means, chooser means and connection means are provided on an XDMCP host computer arranged to run the XDM program.

Viewed from a second aspect, the present invention provides a method of facilitating connection of a terminal to a server to enable the server to perform a task on behalf of the terminal, there being a plurality of servers which the terminal may connect to, and the method comprising the steps of: (a) retrieving from a storage means data identifying the plurality of servers, and referencing an address conversion means to determine an address currently associated with each server; (b) employing a chooser means to provide information about the plurality of servers to the terminal, the terminal being arranged to display this information so as to enable the user to select one of said servers for connection to the terminal; and (c) in response to a signal from the terminal indicating a user selection of one of said servers, initiating connection of the terminal to the selected server; at least one of the plurality of servers having multiple processors, and the method being characterised by the steps of: (d) for a server having multiple processors, identifying that server in the storage means by use of a generic identifier for the processors within that server; (e) providing the address conversion means with means for periodically identifying one of the processors of that server based on predetermined criteria, and for updating the information in the address conversion means such that at any instant in time, the address associated with the generic identifier is the address of the identified processor; (f) recognising at step (a) any generic identifier, and deferring the referencing of the address conversion means to determine the address associated with that generic identifier until after a user selection of the server corresponding to that generic identifier has been made.

BRIEF DESCRIPTION OF THE DRAWINGS

The present invention will be described further, by way of example only, with reference to a preferred embodiment thereof as illustrated in the accompanying drawings, in which.

DESCRIPTION OF THE PREFERRED EMBODIMENT

Figure 1:
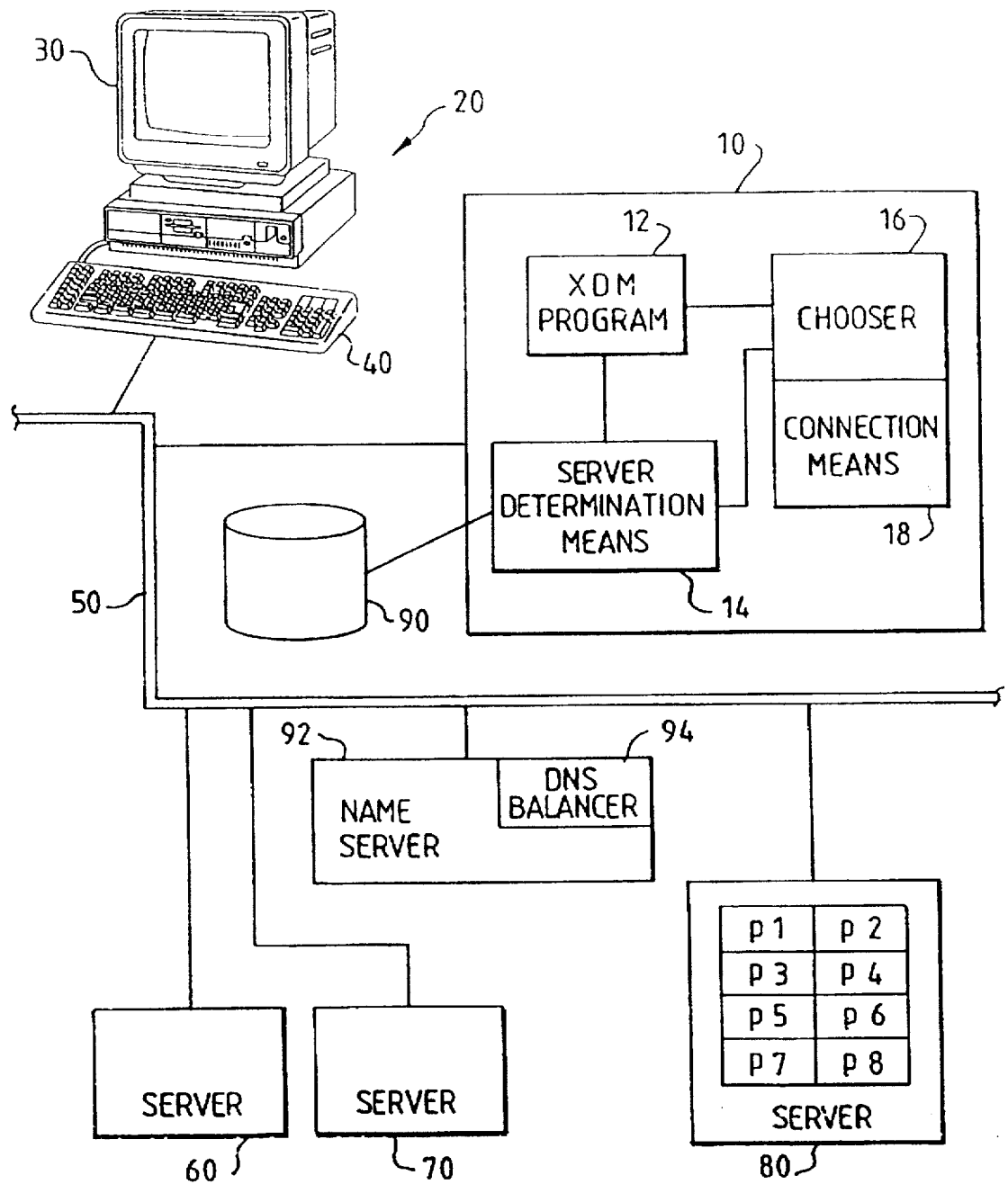
FIG. 1 is a block diagram of a system in accordance with the preferred embodiment of the present invention.

In the preferred embodiment, we will consider the example of an X terminal which is connectable via Ethernet to one of several available servers, at least one of which is a parallel server. In particular, the preferred embodiment is described with reference to the connection of IBM Xstation 130 terminals to a parallel server using an IBM RISC System/6000 XDMCP host. These X terminals, like many other recent examples of X terminals, use the Enhanced X-Window Display Manager Control Protocol. However, it will be apparent to those skilled in the art that the description is not dependent on the particular hardware and software being used, and is generally applicable to other arrangements where terminals are to be connected to parallel servers.

Static balancing of X terminal sessions can be achieved by permanently assigning each X terminal to a particular server via "direct" connection configuration; the various types of connection will be discussed in more detail later. The advantage of such a configuration is that it is simple to set up and, provided there are enough X terminals, can provide a statistically good balance. However, there may be situations where such an arrangement cannot maintain good efficiency and the loads on the server processors can become heavily skewed, due to differing work patterns and job sizes.

Dynamic balancing is preferable in most cases, but this requires the ability to connect any X terminal to any server processor, and to make that selection with regard to the prevailing loads across the server. Ideally such a system should be transparent to the user.

Attempts to automatically balance X terminal connections to a parallel server using the balancing technique described in EP0,648,038 (we shall refer to this hereafter as 'DNS balancing', where DNS stands for "Domain Name System") have shown to fail to provide a good distribution of load. The reason for this is that the XDM program in the XDMCP host resolves the server names before connections to the servers are actually requested, and therefore the measured loads on the parallel processors do not accurately reflect the load at the time that a terminal wishes to connect to the server, but rather that which prevailed at the earlier point when XDM is started on the XDMCP host, when the loads may have been very different.

Before discussing how the preferred embodiment of the present invention solves this problem, a brief description of how an X terminal is generally booted and connected with an XDMCP host shall be given.

There are a number of ways in which an X terminal can be started up, depending on how the booting is organised and how the X terminal is configured. The following description is of a typical startup sequence.

The terminal sends a boot request, which is received by any boot servers on the network. Each boot server sends back a boot response, the first such response to arrive typically determining which boot server will be used, and any subsequent responses being ignored. The boot response typically includes information which tells the X terminal what ip-address it should adopt, and supplies other information including the location of a suitable bootfile and the means to use in order to receive the bootfile. The bootfile is an executable image which will be run by the X terminal, and which usually includes the presentation logic to display X-Windows (hereafter referred to as the XServer). Once the X terminal has received the bootfile, it loads it into memory and runs it. It is usual for the X terminal to then load further files from the boot server, which contain information including configuration details (eg. connection mode), colour definitions and font definitions.

Having been booted, the X terminal can then attach to a server, the method used depending on the configuration of the X terminal in the configuration files. As described earlier, if a 'direct' connection is configured, the X terminal is informed of the identity of the server to which the X terminal must connect, whilst if a 'broadcast' connection is configured, the X terminal broadcasts a connection request over the network, this request being responded to by any servers on the network which are able to manage the X terminal session. If, however, an 'indirect' connection is configured, the X terminal will be informed of the identity of the XDMCP host which the X terminal must contact and which will assist in determining which servers are available. It is the processing that occurs when an 'indirect' connection is configured that is of interest in the preferred embodiment of the present invention, and therefore the following description concentrates on the case where an XDMCP host is involved.

Figure 2:
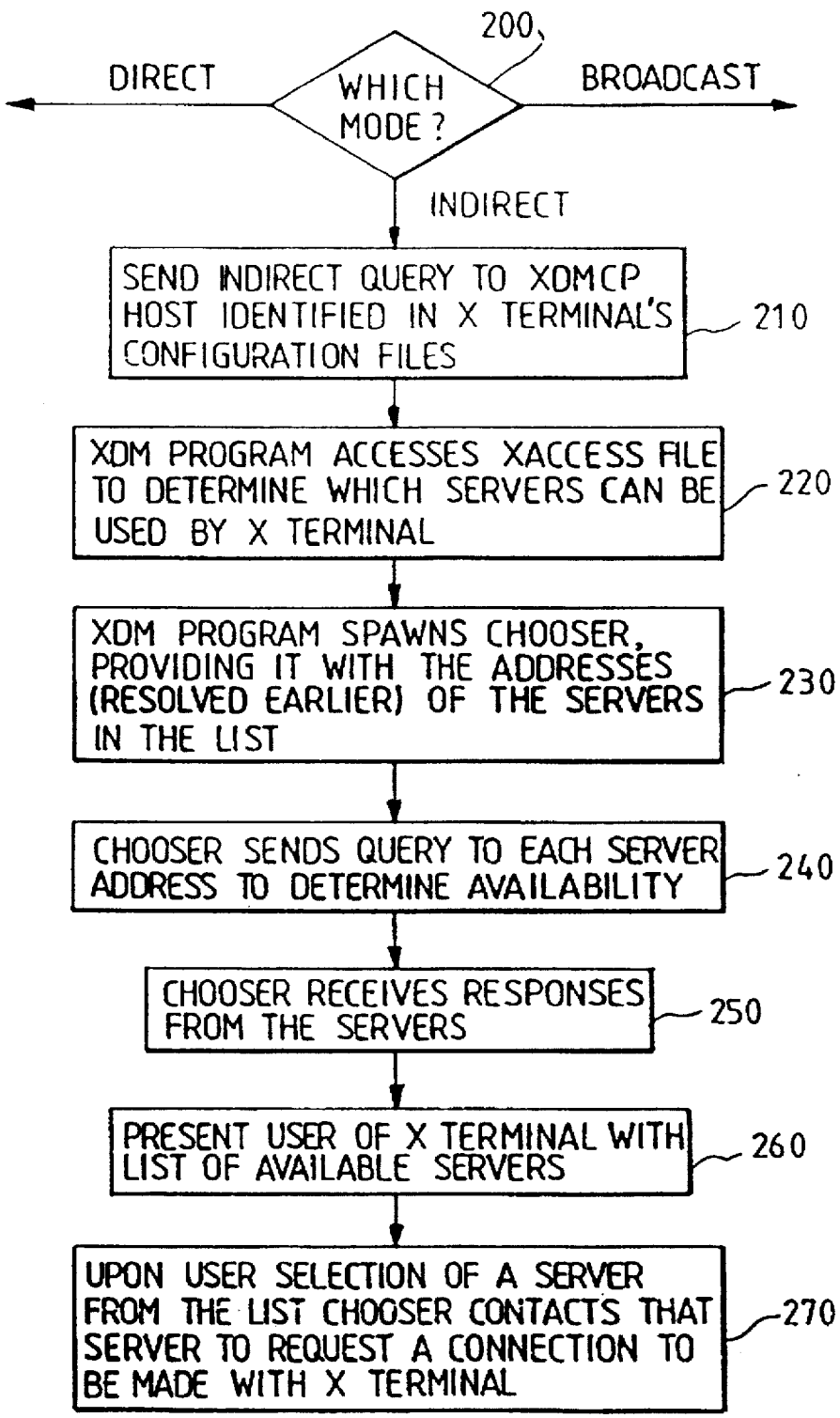
FIG. 2 is a flow diagram illustrating the process employed by a typical XDMCP host to effect a connection between an X terminal and a server.

A general description of the process employed when an X terminal connects to a server in indirect mode will now be provided with reference to FIGS. 1 and 2. The X terminal 20 has one or more input devices connected to it, such as a keyboard 40, to allow a user to provide input to the terminal. Further the X terminal has a display device 30 on which information can be displayed to the user. The X terminal is connected to an Ethernet 50 to enable it to communicate with other machines such as the servers 60, 70, 80, and an XDMCP host 10. As mentioned earlier, once booted, the X terminal can connect to the XDMCP host 10 over the Ethernet 50.

If an X terminal determines on the basis of its configuration information that an indirect connection is configured (step 200), then at step 210, it sends a query to the XDMCP host 10 that is identified in the X terminal's configuration files. When such a query is received, the XDM program 12 running on the XDMCP host 10 employs a server determination routine 14 at step 220 to access a storage device 90 in which a file called an Xaccess file is stored. The Xaccess file includes an entry identifying a set of servers which could be used to manage the session with each X terminal that is configured for indirect connection. This entry is generally called a hostlist entry in the Xaccess file.

At the time the XDM program 12 was started on the XDMCP host, the XDM program 12 will typically have accessed any hostlist entries, and used the server determination means 14 to determine the network address of any server identified in a hostlist. This determination is performed by the server determination means 14 contacting name server facilities 92 available over the network, which resolve the server names to their IP addresses.

This having been done, then at the time when the X terminal 20 connects to the XDMCP host 10, the XDM program 12 spawns a 'Chooser' program 16 at step 230, providing the chooser 16 with the earlier-resolved addresses for the servers in the hostlist. The chooser 16 then sends, at step 240, a query to the addresses for each server in the hostlist entry, requesting the servers to verify that they are able to manage the X terminal session. Based on the replies from these servers received at step 250, the Chooser 16 updates a list of available hosts, which is sent to the X terminal and is displayed as a menu on the display device 30 at step 260. In this menu, the user can see the name of each available server together with a message indicating its willingness to support a connection from the X terminal (usually the message "Willing to Manage"). From the menu the user can select one of the available servers to connect to, the available servers being those which have verified that they are willing to manage the session.

Once the user has chosen one of the servers in the list, the chooser retrieves the address corresponding to that server, this address having already been determined at some preceding point in time (when the XDM program was started on the XDMCP host). Then, at step 270, the chooser employs a connection means 18 to contact the selected server at that address, requesting it to establish a connection with the X terminal.

The above is a general description of how an XDMCP host would operate when not using the technique of the preferred embodiment of the present invention. There are several publications that provide a more detailed description of the XDMCP host and its mode of operation, for example Volume 3 of "The X Window System Users Guide for X.11 R3 and R4" by Valerie Quercia and Tim O'Reilly, published by O'Reilly and Associates.

The above approach works fine when the possible servers in the hostlist entry are not parallel servers. However, if one or more parallel servers are used, then the above technique does not enable the load from such terminal connections to be evenly spread across the processors of a parallel server, even if a load balancing technique such as the earlier described DNS balancing technique is being used. The manner in which the system of the preferred embodiment overcomes this problem will now be described with reference to FIG. 3, which shows how the process carried out by the chooser 16 is altered in the preferred embodiment.

As already mentioned, when the 'indirect' connection mode is used, the XDMCP host 12 runs a Chooser 16, the chooser being selectable by use of the DisplayManager.D-ISPLAY.chooser resource in the xdm-config file. According to the preferred embodiment, an altered chooser is provided, which we shall refer to hereafter as the 'multipleX chooser'. By employing this chooser, the benefits of the present invention can be realised whilst using a standard XDM program on the XDMCP host.

Figure 3:
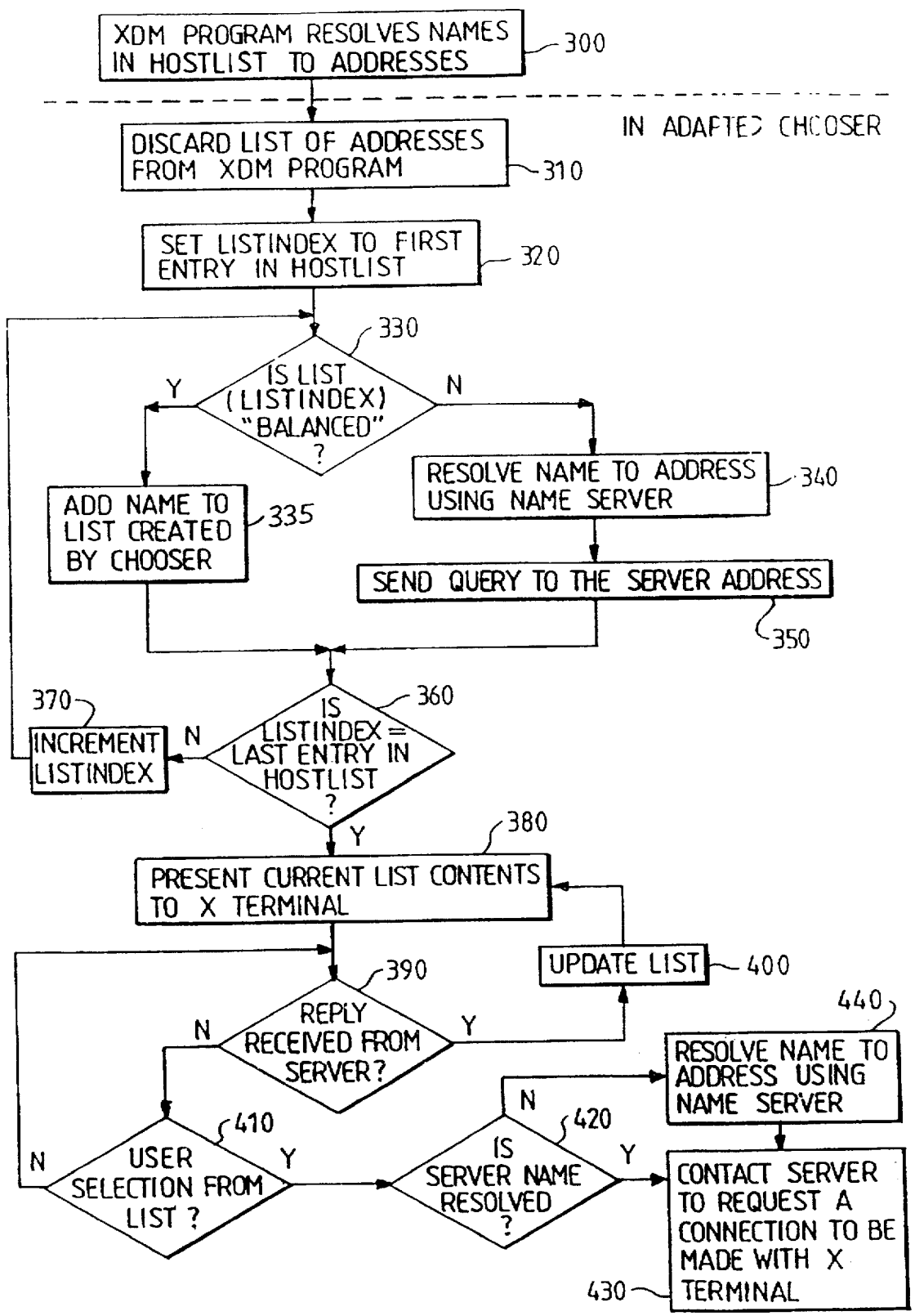
FIG. 3 is a flow diagram illustrating how the general process described with reference to FIG. 2 is adapted in accordance with the preferred embodiment of the present invention.

The manner in which the multiplex chooser operates will now be described with reference to FIG. 3. As previously mentioned, the XDM program will already have resolved server names in the hostlist entries of the Xaccess file to their IP addresses at the time that the XDM program was started on the XDMCP host 10. When an X terminal contacts the XDMCP host, and the multiplex chooser is spawned, the chooser discards the list of addresses provided to it by the XDM program (step 310), but retains the list of server names contained in the hostlist. At step 320, the chooser then sets a list index to the first entry in the hostlist, and determines at step 330 whether the server name at this entry is prefixed by some predetermined indicator which identifies the server as a parallel server. In preferred embodiments, this predetermined indicator is the term "BALANCED".

If the server name is not prefixed by the "BALANCED" indicator, then the process proceeds to step 340, where the nameserver is contacted to resolve that server name to its IP address. Next, at step 350, the chooser sends a query to the server requesting it to send a response verifying that it is able to manage the X terminal session. The process then passes to step 360, where it is determined whether the list index is at the last entry in the hostlist. If it is not the list index is incremented at step 370, and the process loops back to step 330.

If at step 330, the "BALANCED" indicator does prefix the server name at the entry of the hostlist being considered, then this causes the multipleX chooser to defer resolution of the server name until later. Instead, the chooser adds the server name to the list it is creating for presentation to the X terminal user (step 335). The list can be displayed to the X terminal user immediately, or alternatively, the list can be presented after it is determined at step 360 that all servers in the hostlist have been considered. In either case, servers queried at step 350 will be added to the list as their responses are received by the chooser.

Whichever approach is employed, then at step 380 the current list contents prepared by the chooser will be presented to the X terminal user. As responses are received at step 390 from the servers queried at step 350, the list is updated (step 400). Any non-balanced servers which indicate at step 390 that they are willing to manage the X terminal session appear with the usual status indication of "Willing to Manage", but any balanced servers have a status indication of "Balanced Server". It is important to note that the non-balanced servers have at this stage already been resolved to IP addresses, whereas the Balanced Servers have not. This allows the administrator to introduce a generic name for a group of IP addresses (such as the nodes of an IBM 9076 SP2 Balanced server), which is only resolved when the user actually selects the name, and connects. Therefore, the hostlist may be as follows:

%hostlist server1 server2 BALANCED SP2 server3

The list created by the chooser and presented to the user would then include the following information:

| | |
|---|---|
| SP2 | Balanced Server |
| server1 | Willing to Manage |
| server2 | Willing to Manage |
| server3 | Willing to Manage |

If, at step 410, the user chooses any of server1, server2 or server3, then it will be determined at step 420 that the server name has already been resolved, and the process will proceed to step 430, where the connection means 18 contacts the server to request a connection to be made with the X terminal. If, however, the user chooses SP2, then the multipleX Chooser determines at step 420 that the server name has not been resolved, and the process proceeds to step 440. Here, the name server facility is contacted in order to resolve the generic server name to an IP address. If the name server 92 is using a DNS Balancer 94 of the type discussed earlier with reference to EP0,648,038, then the generic name will automatically be resolved to the processor of the parallel server which is least heavily loaded at that time. This having been done, the process then proceeds to step 430, where that processor is contacted to request a connection to be made with the X terminal.

The advantage of this approach is that by using the technique described in published European Patent application EP0.648.038 (a DNS name balancing system) and configuring a pool called "SP2", the IP address which the name "SP2" resolves to will be the least heavily loaded SP2 node at the time that the user chooses to login to the SP2. Thus, a number of X terminal users will be balanced across the SP2 nodes. This is not the case if a standard prior art chooser is employed, since the generic name SP2 would then be resolved to the IP address of the least heavily loaded processor at the time that the XDM program is started on the XDMCP host 10, this not necessarily being the least heavily loaded processor at the time that an X terminal wishes to connect to the parallel server. Further, the above technique only requires the chooser to be altered, leaving the XDM code in its original form. Since choosers can easily be changed merely by selection from within the DisplayManager.DISPLAY.chooser resource, the above approach enables the problem of load balancing to be solved without requiring the XDM program itself to be amended, and hence without affecting any other processes that might be supported by the XDM program.

The specification of non-balanced servers in %hostlist can be by either IP address or Domain Name, but balanced parallel servers MUST be identified using Domain Names. It is hence advisable to identify all servers by fully qualified domain names.

From the above description it is clear that, in order to maximise the efficiency of use of a parallel server, it is desirable to balance as evenly as possible across the processors of a parallel server the load arising from the support of X terminals. The preferred embodiment of the present invention balances this load by transparently connecting an X terminal to the least heavily loaded processor of the parallel server. This 'balancing' of X terminal connections is achieved in the preferred embodiment by the use of domain names for the parallel server(s), deferred resolution by the Chooser, and the use of a DNS balancer. The technique described continues to provide support for existing connection strategies for normal (uniprocessor) servers, but provides the additional facility to balance logins for parallel servers. The criteria for balancing are under the control of the system administrator.

Having thus described my invention, what I claim as new and desire to secure by Letters Patent is:

1. A system for facilitating connection of a terminal (20) to a server (60, 70, 80) to enable the server to perform a task on behalf of the terminal, there being a plurality of servers which the terminal may connect to, and the system comprising:

server determination means (14) for retrieving from a storage means (90) data identifying the plurality of servers, and for referencing an address conversion means (92, 94) to determine an address currently associated with each server;

chooser means (16) for providing information about the plurality of servers to the terminal, the terminal being arranged to display this information so as to enable the user to select one of said servers for connection to the terminal; and connection means (18), responsive to a signal from the terminal indicating a user selection of one of said servers, to initiate connection of the terminal to the selected server;

the system being characterised by:

at least one of the plurality of servers having multiple processors, the data in the storage means (90) identifying that server being a generic identifier for the processors within that server;

the address conversion means (92, 94) having means (94) for periodically identifying one of the processors of that server based on predetermined criteria, and for updating the information in the address conversion means such that at any instant in time, the address associated with the generic identifier is the address of the identified processor; and the server determination means (14) being adapted to recognise any generic identifier, and to reference the address conversion means to determine the address associated with that generic identifier after a user selection of the server corresponding to that generic identifier has been made.

2. A system as claimed in claim 1, wherein the chooser means (16) is adapted to identify a user selection of a server represented by a generic identifier, and to respond to such a user selection by instructing the server determination means (14) to reference the address conversion means (92, 94) to determine the address associated with that generic identifier.

3. A system as claimed in claim 2, wherein the server determination means (14) is incorporated within the chooser means (16).

4. A system as claimed in any of claims 1 to 3, wherein, upon retrieval by the server determination means (14) of data identifying the plurality of servers, the chooser means (16) is arranged to contact any of said servers which are not identified by a generic identifier to determine whether they are able to manage a connection with the terminal, but not to contact prior to user selection any server identified by a generic identifier, the information thus displayed on the terminal identifying any servers with generic identifiers, in addition to any other servers which the chooser means (16) has determined are able to manage the connection with the terminal.

5. A system as claimed in claim 1, wherein the generic identifier has a keyword associated with it.

6. A system as claimed in claim 1, wherein the terminal is an X terminal arranged to run the presentation logic for the X Window system.

7. A system as claimed in claim 6, wherein the server determination means (14), chooser means (16) and connection means (18) are provided on an XDMCP host computer (10) arranged to run the XDM program.

8. A method of facilitating connection of a terminal (20) to a server (60, 70, 80) to enable the server to perform a task on behalf of the terminal, there being a plurality of servers which the terminal may connect to, and the method comprising the steps of:

a) retrieving from a storage means (90) data identifying the plurality of servers, and referencing an address conversion means (92, 94) to determine an address currently associated with each server;

b) employing a chooser means (16) to provide information about the plurality of servers to the terminal, the terminal being arranged to display this information so as to enable the user to select one of said servers for connection to the terminal; and c) in response to a signal from the terminal indicating a user selection of one of said servers, initiating connection of the terminal to the selected server;

at least one of the plurality of servers having multiple processors, and the method being characterised by the steps of:

d) for a server having multiple processors, identifying that server in the storage means (90) by use of a genetic identifier for the processors within that server;

e) providing the address conversion means (92, 94) with means (94) for periodically identifying one of the processors of that server based on predetermined criteria, and for updating the information in the address conversion means such that at any instant in time, the address associated with the generic identifier is the address of the identified processor; and f) recognising at step (a) any genetic identifier, and deferring the referencing of the address conversion means (92, 94) to determine the address associated with that generic identifier until after a user selection of the server corresponding to that generic identifier has been made.

9. A method as claimed in claim 8, further comprising the step of adapting the chooser means (16) to identify a user selection of a server represented by a generic identifier, and to respond to such a user selection by causing the address conversion means (92, 94) to be referenced to determine the address associated with that generic identifier.

10. A method as claimed in claims 8 or claim 9, wherein, upon retrieval at step (a) of data identifying the plurality of servers, the chooser means (16) contacts any of said servers which are not identified by a generic identifier to determine whether they are able to manage a connection with the terminal, but does not contact prior to user selection any server identified by a genetic identifier, the information thus displayed on the terminal at step (b) identifying any servers with generic identifiers, in addition to any other servers which the chooser means (16) has determined are able to manage the connection with the terminal.

* * * * *